March 24, 1959     F. O. E. SCHULTZ     2,878,647
BRAKE BOOSTER UNIT

Filed Jan. 12, 1955     3 Sheets-Sheet 2

INVENTOR.
FORREST O. E. SCHULTZ
BY
RICHEY, WATTS, EDGERTON & McNENNY
ATTORNEYS

March 24, 1959 F. O. E. SCHULTZ 2,878,647
BRAKE BOOSTER UNIT

Filed Jan. 12, 1955 3 Sheets-Sheet 3

REACTION CHAMBER

INVENTOR.
FORREST O. E. SCHULTZ
BY
RICHEY, WATTS, EDGERTON & McNENNY
B.D. Watts
ATTORNEYS

United States Patent Office 2,878,647
Patented Mar. 24, 1959

2,878,647

BRAKE BOOSTER UNIT

Forrest O. E. Schultz, Detroit, Mich., assignor to Midland-Ross Corporation, Cleveland, Ohio, a corporation of Ohio Application January 12, 1955, Serial No. 481,471

7 Claims. (Cl. 60—54.6)

This invention relates generally to fluid pressure brakes for vehicles and particularly to new fluid pressure booster for hydraulic brakes of vehicles.

In brake systems of the hydraulic reaction type there is a certain amount of pressure which is inherently locked in the system and which is undesirable because it partially applies the brakes. In brake systems of the vacuum reaction type an undesirably high input pressure is required to actuate the booster.

The present invention provides a system which possesses the good features of both of those systems and which reduces the locked in pressure to an amount insufficient partially to apply the brakes and greatly reduces the input pressure required to actuate the booster.

Thus this invention provides means for automatically varying the output fluid pressure in direct ratio to the applied fluid pressure, for reducing the "cut in" pressure to below that of the straight vacuum reaction system, for reducing the "hang on" during brake release, and for portraying, through "feel" on the driver's foot and with substantial accuracy and almost instantly, the actual braking conditions existing at any instant.

The present invention will be better understood by those skilled in the art from the drawings which accompany and form a part of this specification and in which.

Figure 1:
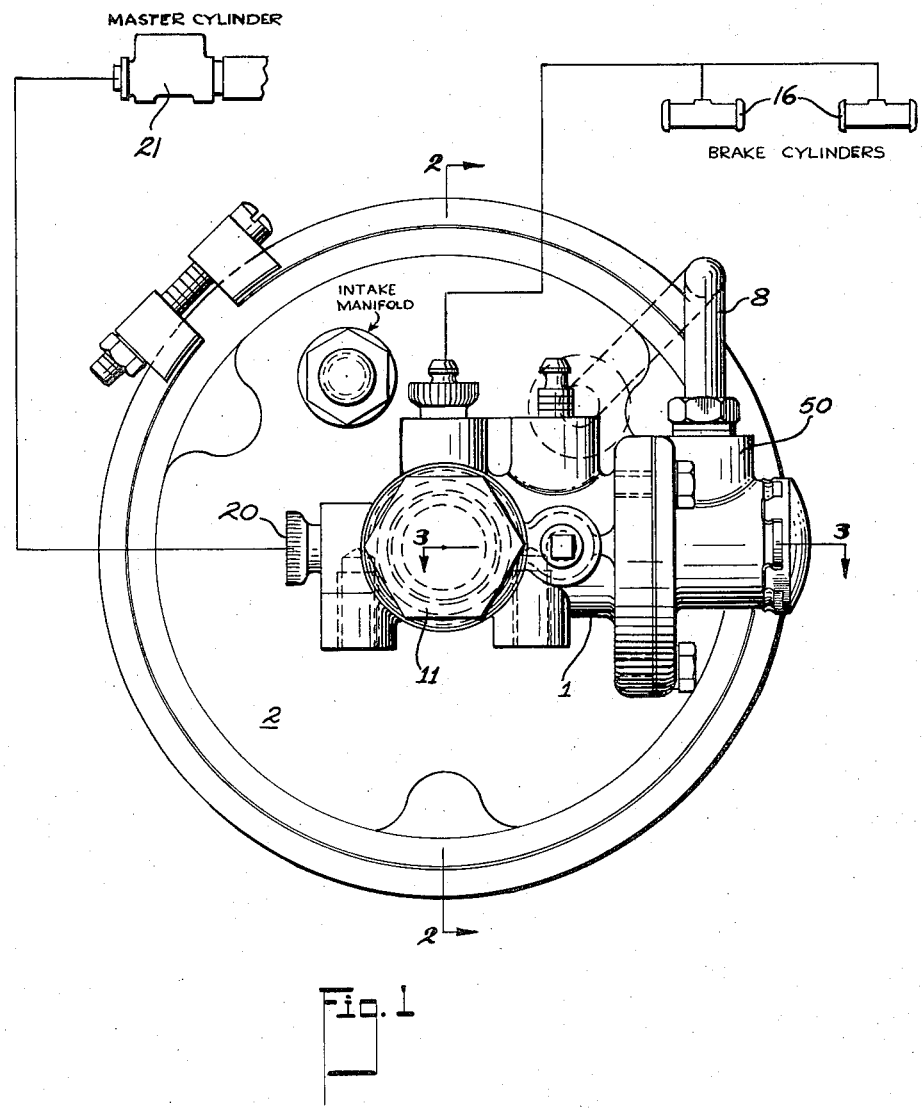
Fig. 1 is an end elevational view of a preferred embodiment of the present invention.

The apparatus shown in the drawings is commonly known as a vacuum booster unit for a hydraulic brake system.

Figure 2:
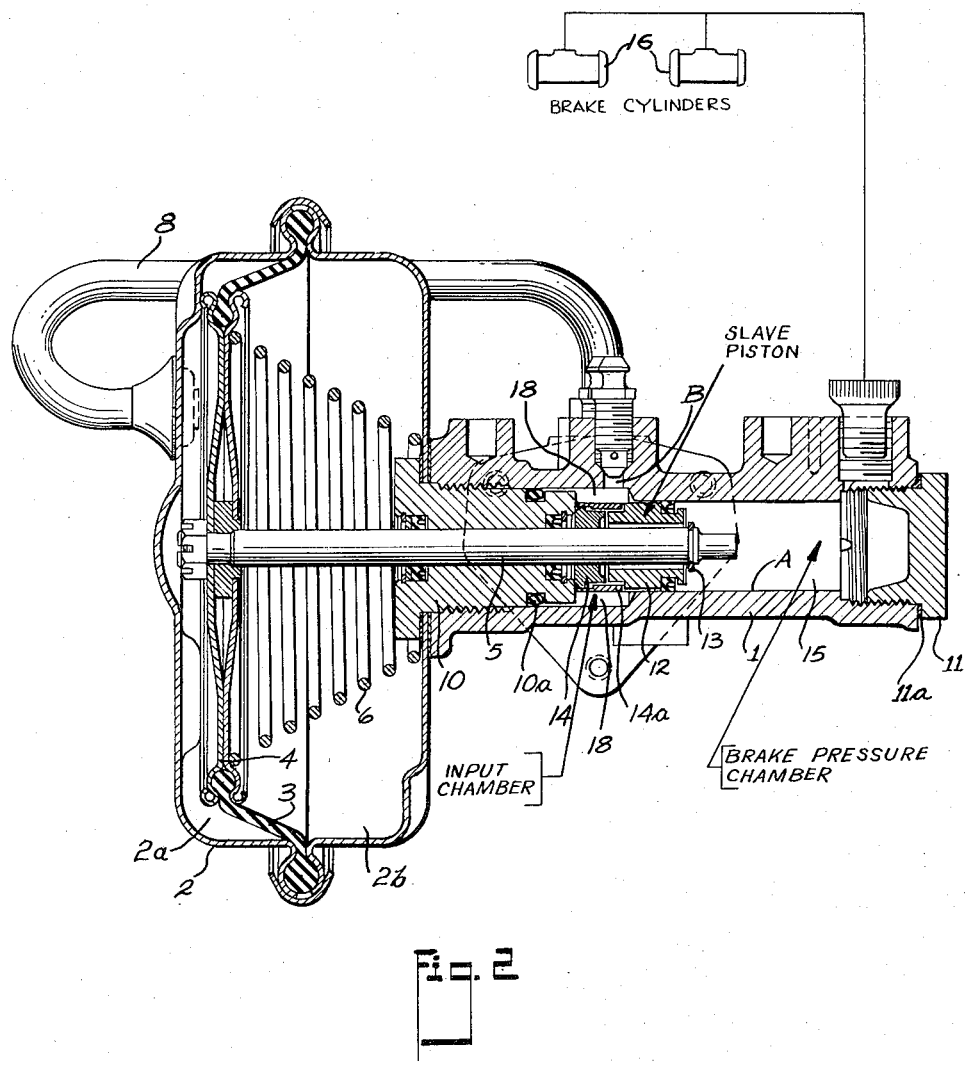
Fig. 2 is a vertical, cross-section taken on line 2—2 of Fig. 1.
Figure 3:
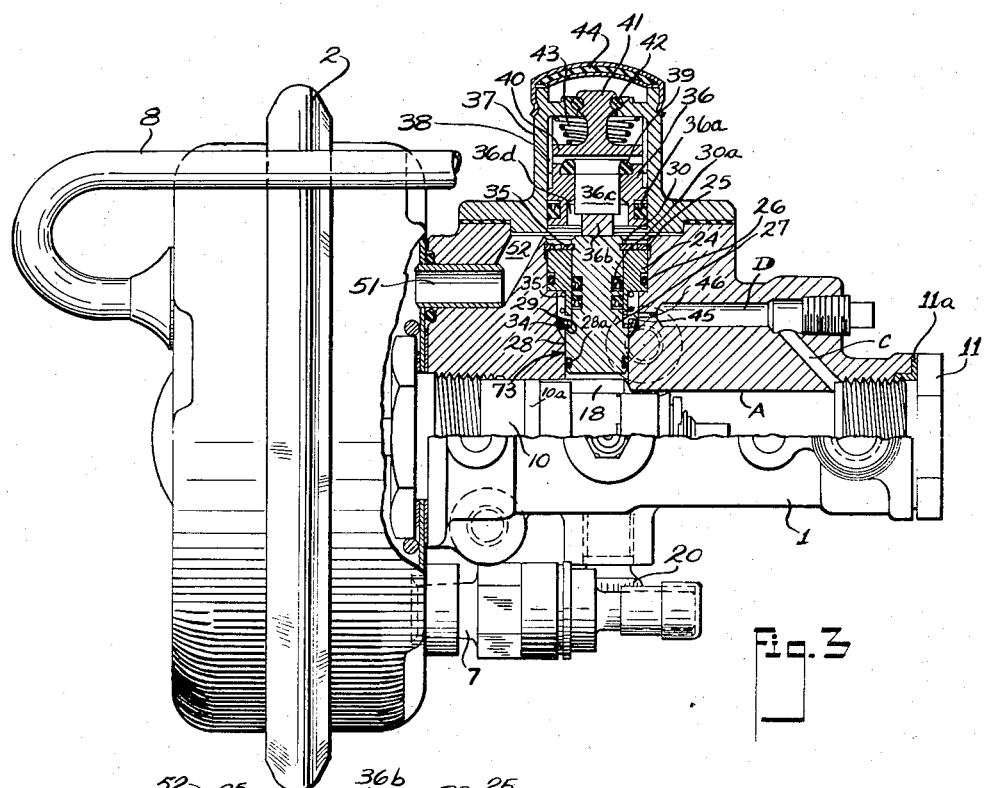
Fig. 3 is a top plan view, partly in horizontal section, taken on line 3—3 of Fig. 1.

This unit as shown in Fig. 2, comprises a body 1 and a diaphragm, or vacuum chamber housing 2 connected to one end of the body. The housing 2 is provided with a pressure responsive movable wall illustrated in the preferred embodiment as an annular diaphragm 3 having its outer periphery connected to the housing 2 and its inner periphery connected to discs 4 thereby defining in housing 2 a variable pressure chamber 2a and a vacuum chamber 2b. Chamber 2b is at all times connected by a tubular fitting 7 best seen in Fig. 3 to a source of vacuum, as for example, the intake manifold of an engine on a vehicle equipped with this device. Referring again to Fig. 2 variable pressure chamber 2a is connected by way of a tube 8 to valve means presently to be described and controlling the admission and exhaust of fluid pressure from chamber 2a. A force transmitting member on piston rod 5 extending into the body 1 and connected to the discs 4 in sealing relation therewith is provided to transmit force between the pressure responsive movable wall and a hydraulic slave piston presently to be described and located in the body 1. A return spring 6, positioned in chamber 2b and engaging the housing 2 and discs 4, is provided to urge the movable wall to the left as seen in Fig. 2 and retract the piston rod 5 responsive to exhaust of fluid pressure from chamber 2a.

The body 1 is provided with a plurality of intersecting bores A, B, C and D. Bore A is closed at the diaphragm housing end by a bushing 10 through which the piston rod 5 extends and is closed at the other end by a plug 11. Ring seal 10a and gasket 11a seal the spaces between the body 1 and bushing 10 and plug 11, respectively, against escape of fluid therethrough. A slave piston 12 made of semi-plastic material such as nylon is slidably mounted in bore A and piston rod 5 extends through this piston and is provided with a snap ring 13 or the like to engage one end of the piston 12. A collar 14 surrounds and is fixed to rod 5, is engageable with the other end of piston 12 and acts as a check valve during such engagement. Sleeve 14a is slidable on collar 14 and piston 12 and is provided with a series of slots or holes about its periphery. It is of such a length as to hold piston 12 off the face of collar 14 when the unit is in the fully released position, i. e., when collar 14 and sleeve 14a abut bushing 10. Movement of rod 5 moves the piston in bore A in one direction by pressing collar 14 against the piston and in the other direction by pressing snap ring 13 against the piston. The portion of bore A indicated at 15 constitutes a brake pressure chamber which is in communication with the brake cylinders 16 through the outlet 17. The part of bore A indicated at 18 constitutes an input chamber which is connected through inlet 20 to a master cylinder 21 so that pressure exerted on liquid in the master cylinder as by a foot pedal will be transmitted to liquid in the input chamber.

Figure 4:
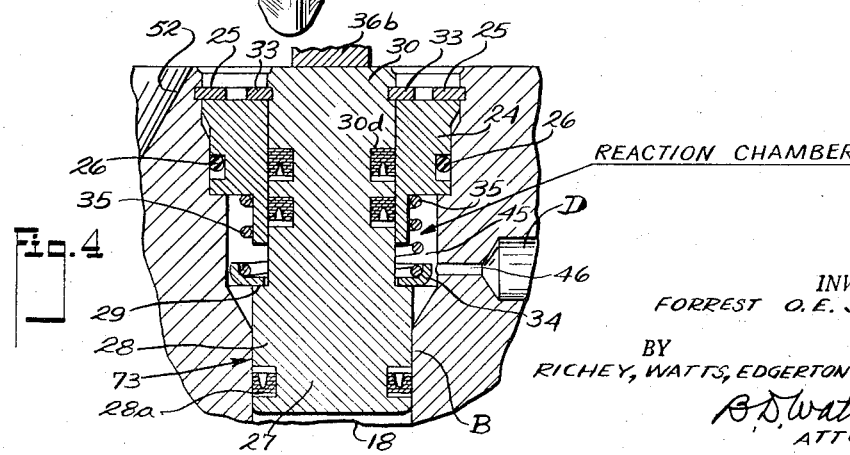
Fig. 4 is a fragmentary, enlarged view of a portion of Fig. 3.

The bore B (see Figs. 3 and 4) extends outwardly from the input chamber 18 and is fitted with a guide bushing and a valve actuating or control piston. The bushing 24 is held in place, as by snap ring 25, seated in a groove in body 1, and is provided with fluid sealing packing 26 in its outer surface. The control piston 27 has a body portion 28, a shoulder 29, and a shank 30 of reduced diameter, which is slidable in and guided by the interior surface of bushing 24.

The body portion 28 of the control piston is provided with packing means 28a in its outer surface which is in sealing and guiding engagement with the walls at the inner end of bore B. The stem 30 extends through bushing 24 and is provided with fluid sealing packing 30a in its outer surface which seals the space between the stem and the bushing against escape of fluid therethrough. A snap ring 33, or similar suitable means, is seated in a groove in the stem to engage the outer end of the bushing to limit inward movement of the piston.

A spring-retaining cup 34 is mounted on the shoulder 29 of piston 27 and a spring 35 is compressed between the inner end of bushing 24 and cup 34. This spring 35 serves to urge piston 27 toward its innermost position when fluid pressure on the inner end of the piston is relieved.

The outer end of the control piston 27 bears against a central downwardly projecting portion 36b of a valve piston 36 which is slidably movable endwise in a valve housing 37. This valve piston is provided with fluid sealing packing 36a near its inner end, has a cylindrical surface which slidably engages ribs 38 on the inner surface of the housing and at its outer end is provided with a flexible, annular valve seat 39 which is engageable with the disk-like base 40 of air valve 41. This valve engages seat 42 in the outer end of housing 37 and is urged into such seating position by spring 43. A screen 44 encloses the outer end of the valve housing and serves to prevent solid objects from being carried into the valve along with the air which passes therethrough.

The part 45 of bore B in which shoulder 29 and part of stem 30 are located may be considered as the reaction chamber. Bore D communicates with the reaction chamber in bore B through a small orifice 46.

It will be noted that communication is provided between chambers 2a and 2b to exhaust fluid pressure from chamber 2a by way of tube 8 communicating with chamber 2a as shown in Fig. 2, lateral projection 50 connecting tube 8 with the interior of the valve housing 37 as shown in Fig. 1, thence (see Fig. 3) by way of the space between the valve housing 37 and valve 41, the space between base 40 of air valve 41 and valve seat 39, through a central passage 36c and connecting radially offset passageways 36d of the valve piston 36 and then through passages 51 and 52. It will be understood that when a source of vacuum, such as the intake manifold of an internal combustion engine is connected to fitting 7 and air valve 41 is closed at seat 42, air will be withdrawn from housing 2 on both sides of the diaphragm, and that when valve piston 36 is moved outwardly and seat 39 engages the base 40 of valve 41, the flow of air out of chamber 2a through tube 8 will be interrupted by reason of the closing of the outlet passage through the valve piston. Upon further outward movement of the valve piston, the valve 41 will be opened at seat 42 and air at atmospheric pressure may enter the valve housing and flow through tube 8 into chamber 2a.

The drawings show the several parts of the present apparatus in the position they occupy when the brakes are in relaxed position. A condition of vacuum exists on both sides of the diaphragm, the pressures on the liquid in chambers 15 and 18 are low (residual), piston 12 is in position to apply pressure to the liquid in the chamber 15 and piston 27 is in position to be actuated to close vacuum valve 36 and open the air valve 41.

When the brakes are to be applied, force is exerted, as by a foot pedal, on liquid in the master cylinder 21 and such force is transmitted to liquid in the input chamber 18 and is applied against the inner end surface of piston 27 with resultant outward movement of this piston. Such movement presses seat 39 on valve piston 36 against the base portion 40 of the air valve 41 and interrupts the connection of the source of vacuum with the chamber 2a and then moves air valve 41 off its seat 42 with the resultant admission of air through tube 8 and into chamber 2. Thereupon, the air moves diaphragm 3 to compress spring 6, pushes rod 5 through bushing 10, brings collar 14 against the adjacent end of piston 12 and then pushes that piston endwise in the brake pressure chamber 15 and applies pressure to the liquid in that chamber and through the connecting lines to the brake cylinders 16 with resultant application of the brakes.

The pressure applied by piston 12 on liquid in the brake pressure chamber 15 is transmitted through liquid in bores C, D and orifice 46 and into the reaction chamber 45 where it reacts against the packings 28a and 30a on the control piston 27.

When this liquid pressure in chamber 45 reaches the point at which it overcomes the force of the input fluid pressure reacting on body portion 28 of piston 27, it causes piston 27 to move inward and to permit spring 43 to close air valve 41 at seat 42. It should be noted that the affected area of piston 27 with respect to fluid pressure in chamber 45 is the cross-sectional area of body portion 28 minus the cross-sectional area of stem 30, and the input pressure from the master cylinder reacts over the cross-sectional area of body portion 28 in the opposite direction. Thus it is possible by suitably proportioning these two areas to attain any desired ratio of input to output fluid pressure. If the input pressure from the master cylinder is decreased, the output pressure in chamber 45 will cause the piston 27 to move still further inward thereby opening valve 39 to allow air to flow from the high pressure to the low pressure side of diaphragm 3 in housing 2 through tube 8, valve piston 36, and passages 52 and 51, thus reducing the fluid differential pressure in housing 2 and relaxing fluid pressure in brake pressure chamber 15.

In order that the residual pressure generally maintained in hydraulic brake systems will not cause a higher wheel cylinder pressure, as with a purely hydraulic reaction, a small additional force acting against piston 27 forcing it inward and urging valve seat 39 open is provided by means of spring 35 and differential fluid pressure between the two chambers of diaphragm housing 2 reacting against valve piston 36 at seal 36a. This small force is added to the reacting force of the wheel cylinder pressure in chamber 45 and becomes a factor in the final ratio of the apparatus.

At any point and through the entire range of the unit when the output pressure in chamber 45 plus the force of differential fluid pressure mentioned above reacting on valve piston 36 and the force of spring 35 exactly balances the force of the lower input pressure reacting on body portion 28 of piston 27, both valve seats 42 and 39 are closed and the apparatus is in a holding or "lap" position.

In this manner the air valve is automatically controlled in response to variations in liquid pressure in the brake pressure chamber which is the same as that in the brake lines and cylinders as well as differential fluid pressure in housing 2.

This combination and arrangement of parts makes it possible for the driver to apply the brakes with the exertion of comparatively small force, to utilize the power of the apparatus practically from the instant his foot touches the pedal, being unaware of the point at which the assist commences, to impart a "feel" to the pedal in direct proportion to the braking pressure at the wheels, of the vehicle throughout the range of the apparatus and to maintain automatically a constant braking pressure indefinitely at any desired amount.

In a typical straight hydraulic reaction brake system an output pressure of approximately 20 p.s.i. is required to overcome the resistance of the return spring and the friction of the power diaphragm and this pressure amounts to about two inches of vacuum. This value of pressure is inherently locked in the system and is undesirable because it partially applies the brakes.

In a typical straight vacuum reaction brake system an input pressure of about 80 p.s.i. is required before the resistance of the power diaphragm and the force of the return spring are overcome and the power assist becomes effective. This high input pressure is a disadvantage in itself and also because the overall power assist throughout the range of brake application is less than for the straight hydraulic reaction system.

The present invention is a combination of features of the straight hydraulic reaction system and the straight vacuum reaction system. The resulting apparatus has the new, unique and surprising results of actuating the brakes with an output pressure of from about 6 to about 10 pounds, which is too low partially to apply the brakes; as contrasted with at least 20 p.s.i. and partial brake application in the straight hydraulic reaction system and an input pressure of about 20 p.s.i. as contrasted with about 80 p.s.i. of the straight vacuum reaction system.

These results are traceable in part to the combined use of air pressure and spring pressure to return the control piston to the brake off position. Since air pressure supplements the spring pressure the spring may be made weaker than in the straight hydraulic reaction system and as the strength of the spring is decreased the deviation from the desired strength due to manufacturing tolerance decreases.

It should be understood that the apparatus described at length herewith can, in addition to vacuum, utilize air or any other fluid as an operating medium in connection with a fluid pressure differential engine.

Having thus described the present invention so that others skilled in the art may be able to understand and practice the same, I state that what I desire to secure by Letters Patent is defined in what is claimed.

What is claimed is:

1. A booster unit for a hydraulic brake system comprising a body having an input chamber communicating with a master cylinder to receive liquid pressure therefrom, a bore communicating with said input chamber, a brake pressure chamber to deliver liquid pressure to brakes, and a reaction chamber in said bore and communicating with said brake pressure chamber, an imperforate piston separating said input and brake pressure chambers against flow of liquid from one chamber to the other chamber, differential pressure means to move said piston to apply pressure on liquid in said brake pressure chamber, and means for controlling said differential pressure means, said control means including valve means to control the flow of air into said differential pressure means and piston control means in said bore separating said input and reaction chambers, partly defining said reaction chamber and serving to move said valve means, said piston control means and valve means being responsive to hydraulic pressure in the input chamber acting in opposition to the sum of the pressure in said brake pressure chamber and the differential pressure in said differential pressure means.

2. A booster unit for a hydraulic brake system comprising a body having an input chamber communicating with a master cylinder to receive liquid pressure therefrom, a bore communicating with said input chamber, a brake pressure chamber to deliver liquid pressure to brakes, and a reaction chamber in said bore and communicating with said brake pressure chamber, an imperforate piston separating said input and brake pressure chambers against flow of liquid from one chamber to the other chamber, differential pressure means to move said piston to apply pressure on liquid in said brake pressure chamber, said differential pressure means including a movable wall having opposite sides subjected to a source of constant pressure and a source of variable pressure, respectively, and means for controlling said differential pressure means including valve means and piston control means in said bore separating said input and reaction chambers and partly defining said reaction chamber, said valve means being operative to admit air to said differential pressure means for varying the pressure at one side of said movable wall, said piston control means being operative to move said valve means and being responsive to hydraulic pressure in the input chamber acting in opposition to the hydraulic pressure in said brake pressure chamber, said valve means including a movable valve piston in constant engagement with said piston control means and having opposed surface portions communicating, respectively, with opposite sides of said movable wall, said valve piston being responsive to the differential in pressure at opposite sides of said movable wall to act in opposition to hydraulic pressure in said input chamber acting on said piston control means.

3. A booster unit for a hydraulic brake system comprising a body having an input chamber communicating with a master cylinder to receive liquid pressure therefrom, a bore communicating with said input chamber, a brake pressure chamber to deliver liquid pressure to brakes, and a reaction chamber in said bore and communicating with said brake pressure chamber, an imperforate piston separating said input and brake pressure chambers against flow of liquid from one chamber to the other chamber, differential pressure means to move said piston to apply pressure on liquid in said brake pressure chamber, said differential pressure means including a movable wall and an air chamber and a vacuum chamber on opposite sides thereof, and means for controlling said differential pressure means including air valve means and vacuum valve means in said bore separating said input and reaction chambers and partly defining said reaction chamber, said air valve means being biased to a normally closed position to prevent admission of air to said air chamber and said vacuum valve means being normally open to permit communication between said air and vacuum chambers, said vacuum valve means being movable into closing engagement with said air valve means to prevent communication between said air and vacuum chambers and being operable upon additional movement to open said air valve means to admit air to said air chamber, said vacuum valve means having opposed surface portions responsive, respectively, to pressure in said air and vacuum chambers and tending to move said vacuum valve means out of engagement with said air valve means, and control means positioned in said bore, engageable with said vacuum valve means and having opposed surfaces exposed to fluid pressure in said input chamber and in said reaction chamber, respectively, and responsive to hydraulic pressure in said input and reaction chambers to move said control means for actuating said vacuum and air valve means.

4. The combination of elements set forth in claim 1 in which the control piston means includes a movable piston having a body portion in sealing and guiding engagement with the walls of said bore and in which the valve means includes a valve piston movable as a unit with said piston body portion, said piston body portion having opposed surfaces exposed, respectively, to liquid pressure in said input chamber and in the brake pressure chamber, said valve piston having opposed surfaces responsive to said differential pressure in said differential pressure means.

5. The combination of elements set forth in claim 1 in which the control piston means includes a bushing in said bore, a piston having a body portion in said bore, a shoulder and a shank of reduced diameter extending into said bushing, surfaces of said shoulder, shank and bushing partly defining a reaction chamber in said bore, the inner end and shoulder of said piston being subjected to liquid pressure in said input chamber and in said brake pressure chamber, respectively, and the outer end surface of said shank being in engagement with said valve means and subjected to differential pressure acting thereon.

6. The combination of elements set forth in claim 1 in which the said valve means includes a valve housing, a valve in the housing to control the admission of air at atmospheric pressure into said differential pressure means and a valve piston in said housing movable into engagement with said valve to move the latter to open position, said valve piston being engageable with and movable by said control piston means.

7. A booster unit for a hydraulic brake system comprising a body having an input chamber communicating with a master cylinder to receive liquid pressure therefrom, a brake pressure chamber to deliver liquid pressure to brakes, a bore communicating with said input chamber and a reaction chamber in said bore communicating with said brake pressure chamber, a piston separating and serving to prevent the flow of fluid between said input and brake pressure chambers, differential pressure means to move said piston to apply pressure on liquid in said brake pressure chamber, and means for controlling said differential pressure means, said control means including valve means and piston control means in said bore separating said input and reaction chambers and partly defining said reaction chamber, said valve means including a valve housing, a valve in the housing to control the admission of air at atmospheric pressure into said differential pressure means, a valve piston in said housing movable into engagement with said valve to move the latter to open position, said valve piston being engageable and movable with said piston control means, said piston control means including said bore, a bushing in said bore, a piston having a body portion in said bore, a shoulder and a shank of reduced diameter extending into said bushing, surfaces of said shoulder, shank and bushing also partly defining said reaction chamber, the inner end of said piston being subjected to liquid pressure in said input chamber urging the piston outwardly in said bore, the shoulder being subjected to liquid pressure in the brake pressure chamber urging the piston inwardly, and the outer end of said shank being subjected to differential pressure in said differential fluid means acting on said valve piston and urging the piston inwardly.

References Cited in the file of this patent

UNITED STATES PATENTS

| | | |
|---|---|---|
| 2,260,490 | Stelzer | Oct. 28, 1941 |
| 2,260,492 | Stelzer | Oct. 28, 1941 |
| 2,383,682 | Price | Aug. 28, 1945 |
| 2,433,953 | Ingres | Jan. 6, 1948 |
| 2,448,464 | Rockwell | Aug. 31, 1948 |
| 2,638,748 | Miller | May 19, 1953 |
| 2,670,603 | Allin et al. | Mar. 2, 1954 |
| 2,705,402 | Stelzer | Apr. 5, 1955 |
| 2,720,954 | Pratt | Oct. 18, 1955 |